(12) United States Patent
Liotti

(10) Patent No.: US 11,994,854 B2
(45) Date of Patent: May 28, 2024

(54) EXPLOITATION OF AUTOMOTIVE AUTOMATED DRIVING SYSTEMS TO CAUSE MOTOR VEHICLES TO PERFORM FOLLOW-ME LOW-SPEED MANOEUVRES CONTROLLABLE FROM THE OUTSIDE OF THE MOTOR VEHICLES BY USER TERMINALS

(71) Applicant: C.R.F. SOCIETA' CONSORTILE PER AZIONI, Orbassano (IT)

(72) Inventor: Luca Liotti, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 531 days.

(21) Appl. No.: 17/281,605

(22) PCT Filed: Sep. 27, 2019

(86) PCT No.: PCT/IB2019/058213
§ 371 (c)(1),
(2) Date: Mar. 31, 2021

(87) PCT Pub. No.: WO2020/070600
PCT Pub. Date: Apr. 9, 2020

(65) Prior Publication Data
US 2021/0389760 A1    Dec. 16, 2021

(30) Foreign Application Priority Data

Oct. 4, 2018    (IT) .......................... 102018000009179

(51) Int. Cl.
*G05D 1/00*    (2006.01)
*B60W 10/04*    (2006.01)
(Continued)

(52) U.S. Cl.
CPC ........... *G05D 1/0016* (2013.01); *B60W 10/04* (2013.01); *B60W 10/18* (2013.01); *B60W 10/20* (2013.01);
(Continued)

(58) Field of Classification Search
CPC ......... G05D 1/0016; G05D 2201/0213; G05D 1/0282; B60W 10/04; B60W 10/18;
(Continued)

(56) References Cited

U.S. PATENT DOCUMENTS

| | | | |
|---|---|---|---|
| 2010/0063652 A1* | 3/2010 | Anderson | .............. G08C 17/02 |
| | | | 235/494 |
| 2016/0224025 A1 | 8/2016 | Petel | |
| 2017/0371353 A1* | 12/2017 | Millinger, III | ....... G05D 1/0094 |

FOREIGN PATENT DOCUMENTS

| | | |
|---|---|---|
| DE | 102014007915 A1 | 12/2015 |
| DE | 102015017143 A1 | 2/2017 |
| EP | 3284651 A1 | 2/2018 |

OTHER PUBLICATIONS

International Search Report and Written Opinion of the ISA issued in PCT/IB2019/058213, dated Jan. 15, 2020; ISA/EP.

* cited by examiner

*Primary Examiner* — Abby Y Lin
*Assistant Examiner* — Renee LaRose
(74) *Attorney, Agent, or Firm* — Brent G. Seitz

(57) ABSTRACT

System to cause a motor vehicle equipped with an automotive automated driving system to perform a Follow-Me low-speed manoeuvre under the control of a user terminal from the outside of the motor vehicle. The motor vehicle comprises automotive on-vehicle systems comprising a propulsion system, a braking system, a steering system, a sensory system; an automotive communications system to communicate with communications systems of user terminals; and an automotive electronic control unit configured to be connectable to the automotive on-vehicle systems and to the communications system, and to cooperate with the automotive on-vehicle systems to implement said automotive automated driving system. The user terminal comprises a digital image capture device and a communications system to communicate with automotive communications systems. The user terminal is programmed to communicate and cooperate with the electronic control unit of the motor vehicle to implement a Follow-Me functionality that allows a user from the outside of the motor vehicle and in possession of the user terminal to cause the motor vehicle to perform a Follow-Me low-speed manoeuvre under the control of the user terminal. The user terminal is further programmed to:
  set up a communication between the communications systems of the motor vehicle and of the user terminal, (Continued)

activate the digital image capture device so that the user can frame the motor vehicle, capture and process one or more digital images of the motor vehicle captured by the digital image capture device of the user terminal to identify the motor vehicle in the captured digital images and to compute a relative position of the user terminal relative to the identified motor vehicle based on the captured digital images, implement a surveillance device whose operating state is indicative of a continuous surveillance of the user in possession of the user terminal on the execution of the Follow-Me manoeuvre, and send to the electronic control unit of the motor vehicle Follow-Me data indicative of the relative position of the user terminal relative to the identified vehicle and the operating state of the surveillance device.

The electronic control unit is programmed to:

receive and process the Follow-Me data transmitted by the user terminal to determine the relative position of the user terminal relative to the motor vehicle and the operating state of the surveillance device, and control the automotive automated driving system the motor vehicle based on the Follow-Me data, so as to cause the motor vehicle to perform a Follow-Me low-speed manoeuvre under the control of the user terminal to follow the movements of the user in possession of the user terminal as long as the operating state of the surveillance device is such as to indicate a continuous surveillance of the user in possession of the user terminal on the execution of the Follow-Me low-speed manoeuvre, and to interrupt the Follow-Me low-speed manoeuvre when the operating state of the surveillance device is such as to indicate an interruption of the surveillance of the user in possession of the user terminal on the execution of the Follow-Me manoeuvre.

12 Claims, 4 Drawing Sheets

(51) Int. Cl.
*B60W 10/18* (2012.01)
*B60W 10/20* (2006.01)
*B60W 50/14* (2020.01)
*B60W 60/00* (2020.01)

(52) U.S. Cl.
CPC .......... *B60W 50/14* (2013.01); *B60W 60/001* (2020.02); *B60W 2050/146* (2013.01); *B60W 2420/403* (2013.01); *B60W 2556/45* (2020.02)

(58) Field of Classification Search
CPC .... B60W 10/20; B60W 50/14; B60W 60/001; B60W 2050/146; B60W 2420/42; B60W 2556/45
See application file for complete search history.

EXPLOITATION OF AUTOMOTIVE AUTOMATED DRIVING SYSTEMS TO CAUSE MOTOR VEHICLES TO PERFORM FOLLOW-ME LOW-SPEED MANOEUVRES CONTROLLABLE FROM THE OUTSIDE OF THE MOTOR VEHICLES BY USER TERMINALS

CROSS-REFERENCE TO RELATED APPLICATIONS

This patent application is a U.S. National Phase Application under 35 U.S.C. 371 of International Application No. PCT/IB2019/058213, filed on Sep. 27, 2019, which claims the benefit of Italian patent application No. 102018000009179 filed on Oct. 4, 2018. The entire disclosures of the above-identified applications are incorporated herein by reference.

TECHNICAL FIELD OF THE INVENTION

The present invention relates in general to the automotive automated driving systems, and in particular to the exploitation of automotive automated driving systems to perform Follow-Me low-speed manoeuvres, that are controllable from the outside of the motor vehicles by user terminals, such as personal smart electronic mobile communication devices of drivers from the outside and close to the motor vehicles.

The present invention finds application in any type of road motor vehicle, whether it is used to transport people, such as a car, a bus, a camper van, etc., or to transport goo s such as an industrial vehicle (truck, lorry, articulated vehicle), etc.) or a light or medium-heavy commercial vehicle (van, cabin cruiser, etc.).

STATE OF THE ART

As is known, in recent years car manufacturers have invested considerable resources in the search for Advanced Drives Assistance Systems—ADAS—to improve driving safety and comfort.

For this reason and due to the fact that they will help to achieve the goals set by the European Union on reducing road accidents, ADAS are one of the fastest growing segments in the automotive sector and are destined to become increasingly popular in the coming years.

ADAS safety features are designed to avoid collisions and accidents, offering technologies that warn drivers of potential problems, or to avoid collisions by implementing safeguard measures and taking, control of the vehicles. Adaptive features can automate lighting, provide adaptive cruise control, automate braking, incorporate GPS/traffic signals, connect smartphones, alert drivers of other vehicles of dangers, keep drivers in the right lane, or show what is in blind corners.

ADAS technology is based on vision/camera systems, sensory systems, automotive data networks, Vehicle-to-Vehicle (V2V) or Vehicle-to-Infrastructure (V2I) communications systems. Next-generation ADAS systems will increasingly take advantage of wireless connectivity to offer added value to V2V and V2I communications.

According to studies conducted by the Accident Research of the German. Association of Insurers (GDV), in fact, lane departure warning systems alone are able to prevent up to 15% of road accidents, while crossroad assistance can prevent up to 35% of road accidents.

Technological developments such as the integration of radar and cameras and the fusion of sensory data between multiple applications are thought to determine a change in motor vehicles that will be more substantial over the next two decades than it has been in the 130 years that have elapsed since the first motor vehicle was manufactured.

The final point of these technological developments is usually defined as self driving driverless motor vehicles or autonomous motor vehicles. The two terms are most often used interchangeably, as in the present discussion, while in some specialized environments these two terms are instead used differently to make subtle distinctions.

In particular, the term autonomous motor vehicles has been used to indicate those motor vehicles that resemble today's motor vehicles, namely with seats facing forward and steering wheel, and in which the driver is deprived of driving tasks only in certain circumstances, for example to perform autonomous parking or automatic braking, or to adopt adaptive cruise control to adjust the speed so as to maintain a safe distance from the motor vehicles ahead. In the near future, autonomous motor vehicles could take complete control of driving in heavy traffic or on motorways.

The term self-driving motor vehicles has instead been used to indicate those motor vehicles that are considered to represent a step forward compared to autonomous motor vehicles, namely motor vehicles in which the steering wheel will completely disappear and the motor vehicles will make the whole journey using the same sensory system used by the autonomous motor vehicles.

Disregarding this subtle distinction, the true distinction regards assisted driving motor vehicles, where the motor vehicle assists the driver (who is therefore not exempt from paying attention), braking if the motor vehicle in front brakes, slowing down when needed, and so on, from motor vehicles with automatic or automated driving, where, unlike the previous ones, the motor vehicle has a completely autonomous driving and the driver may not pay attention.

An example of this terminological distinction is presented in the article by Wood et al, (2012), in which the author writes: "This article often uses the term autonomous rather than automated. The term "autonomous" has been chosen because it is currently the most common term in use (and more familiar to the general public). However, the term "automated" is certainly more accurate because it connotes the control or the actions performed by the motor vehicle, while "autonomous" acting alone and independently. Currently, most motor vehicles (that do not know they have a person on their seat) communicate with the Cloud or with other motor vehicles, and do not enter the destination independently. That is why the term "automated" would be better to describe this concept of motor vehicle".

In 2014, the SAE (Society of Automotive Engineers) International, a standardization body in the field of aerospace, automotive, and vehicle industry that deals with developing and defining engineering standards for motorized vehicles of all kinds, including cars, trucks, ships and aircraft, has published a new international standard J3016, which has defined six different levels for automatic driving. This classification is based on how much the driver has to intervene on the motor vehicle, rather than on the motor vehicle's capabilities.

The six levels of automatic driving are:

Level 0—No autonomy: The driver must take care of every aspect of driving, without any kind of electronic support;

Level 1—Driving assistance: The driver must take care of every aspect of driving, but is supported on an informative level (in the form of visual or acoustic alerts) by electronic systems that can indicate the presence of dangerous situations or adverse conditions. At this level, the motor vehicle just analyses and represents the situations, but the driver has the total and full responsibility for the management of the motor vehicle;

Level 2—Partial automation: The driver drives, but there is a first driving integration. At this level, the motor vehicle intervenes on acceleration and braking through safety systems, such as assisted braking and emergency anti-collision braking. The direction and traffic control remain under the control of the driver, although the steering can be, in certain scenarios with clearly visible horizontal road markings, managed in a partially automated way (systems called Lane Keeping Assist and, in more complete versions, Traffic Jam Assist, Autosteer, Highway Assist, depending on the car brand);

Level 3—Conditioned automation: the motor vehicle is able to manage driving in ordinary environmental conditions, managing acceleration, braking and direction, while the driver intervenes in problematic situations in the event of a system request or if the driver checks occurrence of adverse conditions;

Level 4—High automation: The automatic driving system is able to manage any eventuality, but it must not be activated in extreme driving conditions as in case of bad to weather;

Level 5—Complete automation: The automatic driving system is able to manage all situations that can be managed by a human, without any human intervention.

As part of the classification of these new technologies, the Economic Commission for Europe of the United Nations (UN/ECE) also intervened with Regulation n. 79 dE/ECE/324/Rev.1/Add.78/Rev.3—E/ECE/TRANS/505/Rev.1/Add.78/Rev.3 entitled "*Agreement Concerning the Adoption of Harmonized Technical United Nations Regulations for Wheeled Vehicles, Equipment and Parts which can be Fitted and/or be Used on Wheeled Vehicles and Conditions for Reciprocal Recognition of Approvals Granted on the Basis of these United Nations Regulations*", whose Addendum no. 78 of 30 Nov. 2017, using a different nomenclature than the one used by SAE, prescribes uniform provisions on the configuration and operation of the steering systems of road motor vehicles.

Until now, in fact, the main requirement relating to steering systems has been the presence of a positive mechanical connection between the steering control, generally consisting of a steering wheel, and the wheels, to determine the trajectory of the motor vehicle. An over-dimensioned mechanical connection was considered not subject to failure.

Technological advances, the desire to improve the passengers' safety by eliminating the mechanical steering column and the manufacturing advantages associated with greater ease in transferring the steering control between left-hand drive and right-hand drive motor vehicles have led to a review to the traditional approach. Consequently, the regulation has been modified to take into account the new technologies and from now on it will be possible to have steering systems with no mechanical connection between the steering control and the wheels of the motor vehicle.

The systems in which the driver maintains primary control of the motor vehicle but can be assisted by signals generated on board the motor vehicle that influence the steering system are called Advanced Driver Assistance Steering Systems.

Such systems can incorporate, for example, an Automatically Commanded Steering Function, which uses passive infrastructure elements to help the driver maintain the motor vehicle along an ideal trajectory (Lane Guidance, Lane Keeping, Heading Control), to perform low speed manoeuvres in confined spaces or to stop the motor vehicle at a pre-defined point (Bus Stop Guidance).

Advanced Driving Assistance Steering Systems may also include a Corrective Steering Function which, for example, warns the driver of leaving the lane (Lane Departure Warning), corrects the steering angle to prevent the motor vehicle from leaving the lane (Lane Departure Avoidance), or corrects the steering angle of one or more wheels to improve the dynamic behaviour or stability of the motor vehicle.

With any Advanced Driving Assistance Steering System, the driver can decide at any time to deliberately exclude the assistance function, for example to avoid obstacles on the roadway.

This technology also allows influencing or controlling the steering, the engine, and the braking system by means of sensors and signals generated on board the motor vehicle or by external elements, for example signals transmitted by transponders placed along the road or active elements inserted in the road surface. These systems, which do not require the presence of the driver on board the motor vehicle, have been defined as Autonomous Steering Systems.

US 2010/063652 A1 discloses a method and an apparatus for locating an operator using a garment, a number of tracking devices that can be detected by an autonomous motor vehicle, and a controller capable of sending a control signal to the autonomous motor vehicle.

EP 3 284 651 A1 discloses a method of remote-controlled operation of a motor vehicle, in which a control signal is transmitted to a control unit of the motor vehicle via a mobile terminal outside of the motor vehicle. By means of the control unit, the motor vehicle is moved in response to the control signal in an autonomous driving mode in which the motor vehicle is manoeuvred autonomously. The motor vehicle is detected using a mobile terminal detection device. During the manoeuvre, the motor vehicle is operated only in the autonomous driving mode as long as the motor vehicle is detected by the detection device 10 of the mobile terminal.

DE 10 2014 007915 A1 discloses a method for remotely controlling a function of a motor vehicle via a mobile unit, which comprises a detection unit that is directed towards at least one area of the motor vehicle. In a mode that allows the unambiguous identification of the motor vehicle to be operated by the remote control, the area comprises a sign containing the vehicle identification data, which is received by the detection unit, in which the remote control of the function of the motor vehicle is released if the evaluation of the motor vehicle identification data relating to the sign involves a successful recognition of the motor vehicle.

DE 10 2015 017143 A1 discloses a driverless operation method of an automotive system designed to fully automatically drive a motor vehicle, based on at least one driver state information and comprising a position information describing the current position of the driver and/or the quantity of a resource present or requested by the driver and made available in the motor vehicle. The method involves describing information on resources, evaluating the follow-up criterion, automatically moving the motor vehicle to the shortest, in particular minimally possible, operating distance from the driver's current position and/or an intended destination of the driver with subsequent operating information descriptive of the position.

US 2016/224025 A1 discloses a method for securing the remote control of a moving motor vehicle using a mobile terminal. The method comprises the following steps: triggering the remote control of a motor vehicle movement by a user using the mobile terminal; verifying that the user is in view of the motor vehicle by means of the mobile terminal; if the control is positive and shows that the user is in view of the motor vehicle, carry out a remote control of the movement of the motor vehicle and, otherwise, inhibit the control.

Object and Summary of the Invention

The object of the present invention is to provide a technology that allows the Automotive Automated Driving Systems to be simply and safely exploited to perform Follow-Me low-speed manoeuvres that are remotely controlled from the outside of the motor vehicles by means of remote controls in the form of user terminals outside and close to the motor vehicles.

According to the present invention, a system is provided to cause a motor vehicle equipped with an automotive automated driving system to perform a Follow-Me low-speed manoeuvre under the control of a user terminal from the outside of the motor vehicle, as claimed in the attached claims.

DESCRIPTION OF PREFERRED EMBODIMENTS OF THE INVENTION

The present invention will now be described in detail with reference to the attached figures to allow a person skilled in the art to make and use it. Various modifications to the described embodiments will be immediately apparent to the persons skilled in the art and the generic principles described can be applied to other embodiments and applications without departing from the protective scope of the present invention, as defined in the attached claims. Therefore, the present invention should not be considered limited to the described and illustrated embodiments, but it must be accorded the widest protective scope in accordance with the described and claimed characteristics.

Where not defined otherwise, all the technical and scientific terms used herein have the same meaning commonly used by persons skilled in the art pertaining to the present invention. In the event of a conflict, this description, including the definitions provided, will be binding. Furthermore, the examples are provided for illustrative purposes only and as such should not be considered limiting.

In particular, the block diagrams included in the attached figures and described below are not intended as a representation of structural characteristics or constructive limitations, but must be interpreted as a representation of functional characteristics, i.e. intrinsic properties of the devices and defined by the obtained effects or functional limitations, which can be implemented in different ways so as to protect their functionalities (operating abilities).

In order to facilitate the understanding of the embodiments described herein, reference will be made to some specific embodiments and a specific language will be used to describe the same. The terminology used in the present document has the purpose of describing only particular embodiments, and is not intended to limit the scope of the present invention.

Figure 1:
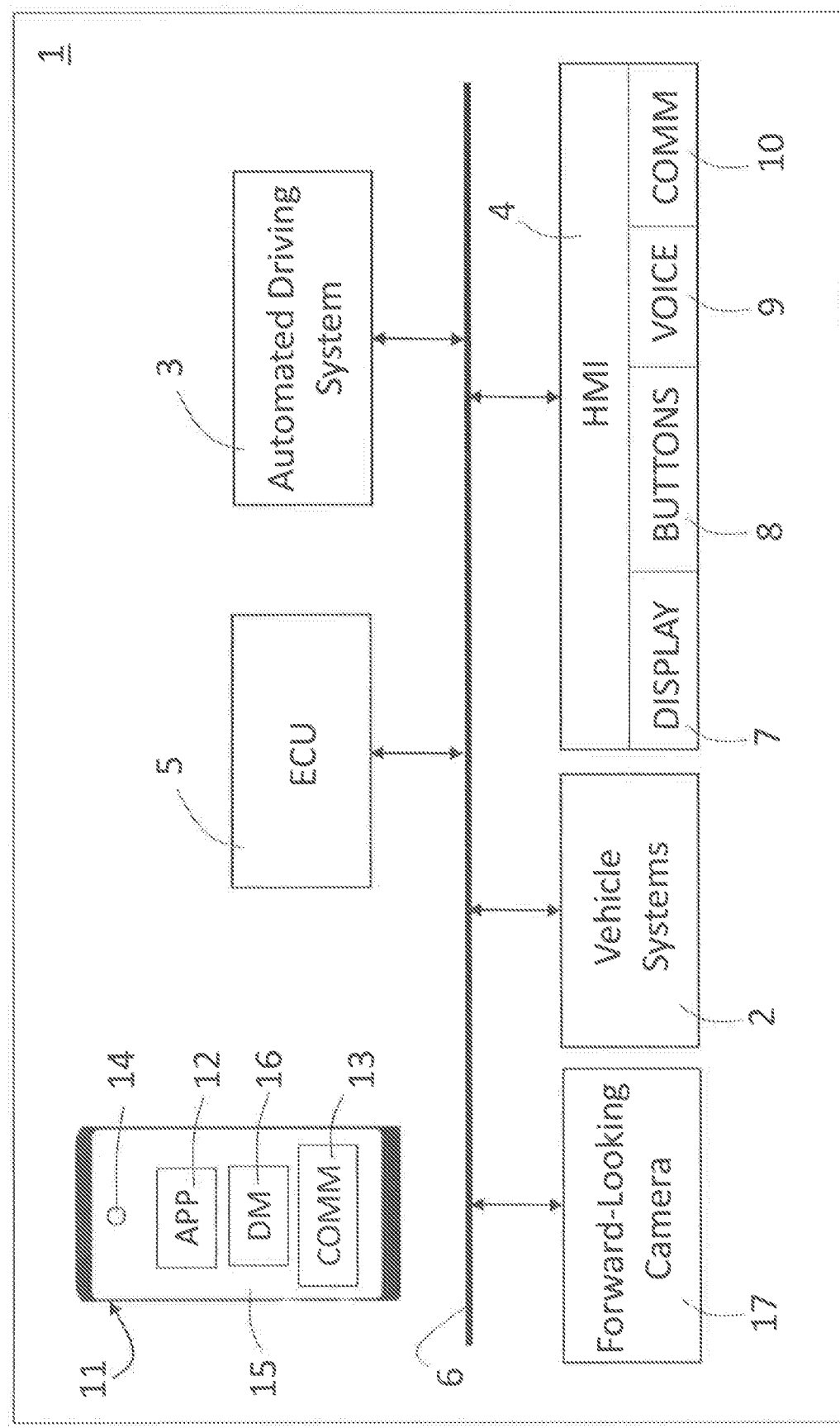
FIG. 1 shows a block diagram of a motor vehicle equipped with an automated driving system according to the present invention.

FIG. 1 shows a block diagram of a motor vehicle 1 equipped with a automotive automated driving system that is remotely-controllable from the outside of the motor vehicle 1 to cause the motor vehicle 1 to perform Follow-me low-speed manoeuvres, as described below in detail.

As shown in FIG. 1, the motor vehicle 1 comprises:
automotive on-vehicle systems 2 comprising, among others, an automated driving system 3 whose implementation involves automotive on-vehicle systems 2 such as the propulsion system, the braking system, the steering system, and the sensory system designed to sense motor vehicle-related quantities such as, for example, wheel angle, steering wheel angle, yaw rate, longitudinal and lateral accelerations, speed, position, etc.,
an automotive user interface 4 (HMI) through which users can interact with automotive on-vehicle systems 2, such as air conditioning system, infotainment system, etc., and
an automotive electronic control unit (ECU) 5 electrically connected, via an automotive on-board communication network 6, for example CAN, FlexRAy or others, to various automotive on-vehicle systems 2, directly or indirectly, namely through dedicated electronic control units, and to the automotive user interface 4, and designed to control operation of the automotive on-vehicle systems 2 and of the automotive user interface 4.

The automotive user interface 4 comprises:
one or different electronic displays 7, one or more of which are for example of the touch-sensitive type, and on one or more of which icons that are selectable by a user by touch or by special soft buttons can be displayed, which icons are related to automotive functions relative to the operation of automotive on-vehicle systems such as the infotainment system, the air conditioning system, the satellite navigation system, etc.,
function selection and activation push-buttons 8, some of the hard type, positioned at various points in the passenger compartment of the motor vehicle 1, including on the steering wheel, in the central console, in the dashboard moulding, near the instrument panel and the gear lever, and others of the soft type, namely displayed on electronic displays,
a voice recognition system 9 (optional),
an automotive communication interlace 10 comprising one or more of
a bidirectional wired communications system, conveniently constituted by the standard serial communications system known as USB (Universal Serial Bus) interface, which, as is known, includes special connectors, known as USB connectors or ports, that can be connected to other USB connectors through special cables known as USB cables,
a bidirectional short-range radio communications system, hereinafter abbreviated as a V2D communications system, which stands for Vehicle-to-Device, and operable to automatically detect bidirectional short-range radio communications systems, hereinafter abbreviated as D2V communications system, which stands for Device-to-Vehicle, of user terminals 11 within its communication range, and to communicate with D2V communications systems detected and identified within its communication range, possibly following an appropriate pairing procedure, if required by the implemented communication technology, and a bidirectional long-range radio communications system, hereinafter referred to as V2X, which stands for Vehicle-to-infrastructure, which can be used to communicate with a remote service centre;

a software application (APP) 12 developed by the automotive manufacturer to allow users, once it has been downloaded, installed, and appropriately set on their user terminals 11, to interact with some automotive on-vehicle systems 2, such as the infotainment system through their user terminals 11.

The V2D and D2V communications systems are configured to communicate through one or different short-range communication technologies that conveniently include Bluetooth technology, for example the one according to the 4.0 specification and also known as Bluetooth Low Energy, Bluetooth LE, or Bluetooth Smart, NFC technology, and Wi-Fi technology.

The V2X communications system is configured to communicate with the remote service centre through one or different long-range communication technologies, conveniently including present and future cellular communication technologies, such as, 2G, 3G, 4G, 5G, etc.

The automotive electronic control unit 5 is designed to store and run an automotive control software comprising software instructions that, when executed, cause the electronic control unit 5 to become configured to cooperate with the automotive on-vehicle systems 2 to implement the automotive automated driving system 3 and to allow a user outside of and close to the motor vehicle 1 to control, using its own user terminal 11 and under his/her own control to cause the motor vehicle 1 to perform Follow-Me low-speed manoeuvres exploiting the automotive automated driving system 3 of the motor vehicle 1.

The user terminal 11 through which the motor vehicle may be caused to perform Follow-Me low-speed manoeuvres can be constituted by a hand-held or wearable personal smart electronic mobile communication device, such as a smartphone, a phablet, a tablet, a personal computer, a smartwatch, etc.

The user terminal 11 comprises a communication interface 13 similar to the automotive communication interface 10 and comprising:

a bidirectional wired communications system,
a bidirectional short-range radio communications system, hereinafter referred to as a D2V communications system, an acronym for Device-to-Vehicle, and
a bidirectional long-range radio communications system, hereinafter referred to as D2X communications system, an acronym for Device-to-Infrastructure.

In order for the user terminal 11 to cause the motor vehicle 1 to perform a Follow-Me low-speed manoeuvre, the user terminal 11 is conveniently equipped with a digital image capture device 14 comprising one or more digital image sensors comprising one or more front cameras and one or more rear cameras.

The user terminal 11 is farther programmed to communicate, through the communication interfaces 10, 13, and cooperate with the electronic control unit 5 of the motor vehicle 1 to expose a Follow-Me functionality through a user may cause the motor vehicle 1 to perform a Follow-Me low-speed manoeuvre.

For the implementation of the Follow-Me functionality, the user terminal 11 and the electronic control unit 5 of the motor vehicle 1 are programmed to conveniently communicate through short-range radio communications systems, without thereby affecting the fact that the Follow-Me functionality could also be implemented through a communication implemented through bidirectional wired communications systems or bidirectional long-range radio communications system.

Moreover, for the implementation of the Follow-Me functionality, the user terminal 11 is equipped with a software application (APP) which can be either an APP specifically dedicated to the implementation of the Follow-Me functionality and downloadable from main online APP stores or which can be constituted by the same APP 12 that is part of the automotive user interface 4 and provided by the automotive manufacturer to allow users to interact with the automotive on-vehicle systems 2, and in which the Follow-Me functionality is also available.

In particular, the APP is designed to cause, when executed, the user terminal 11 on which it has been installed and is running to:

expose, i.e., display on an its own electronic display 15, a graphical user interface (GUI) designed to allow a user to activate the Follow-Me functionality, which allows a user to cause a motor vehicle to perform a Follow-Me low-speed manoeuvre, provide processing capabilities to compute data, hereinafter referred to as Follow-Me data, required to implement of the Follow-Me functionality, better described in detail below, and communicate with the electronic control unit 5 through the communication interfaces 10, 13 to send the Follow Me data required to implement of the Follow-Me functionality.

The electronic control unit 5 is programmed to:
communicate with the user terminal 11 through the communication interfaces 10, 13 to receive the Follow-Me data from the user terminal 11, and
control, based on the received Follow-Me data, automotive on-vehicle systems 2 involved in the automated driving system 3 of the motor vehicle 1 so as to cause the motor vehicle 1 to perform a Follow-Me low-speed manoeuvre under the control of the user terminal 11.

For the implementation of the Follow-Me functionality, the APP is designed to cause, when executed:

the Follow-Me functionality to be started in response to a start command imparted by a user and represented, for example, by recognition of activation of a special start button exposed by the graphic user interface on the display 15 of the user terminal 11, or by recognition of a specific gesture performed by a user on the display 15 of the user terminal 11, after starting the Follow-Me functionality, a communication to be established between the communication interfaces 10, 13 of the user terminal 11 and of the motor vehicle 1, so as to establish a unique pairing between the user terminal 11 and the motor vehicle 1 that prevents potentially dangerous situations to occur, such as, for example, a wrong user terminal to be followed or the possibility for a user terminal to meddle into the communication between the user terminal and the motor vehicle and take control thereof, the digital image capture device 14 of the user terminal 11 to be activated and the user to be prompted, via the graphical user interface, to frame the motor vehicle 1 which is required to perform a Follow-Me low-speed manoeuvre, one or a sequence of digital images of the motor vehicle 1, appropriately spaced temporally, to be captured by the digital image capture device 14 of the user terminal 11 and then processed to identify the motor vehicle 1 in the captured digital images and to compute a relative position of the user terminal 11 relative the motor vehicle 1 based on the captured digital images, a surveillance device 16 to be implemented, also known as Dead Man Switch, whose operating state is indicative of a continuous surveillance of the user on the performance of the Follow-me manoeuvre, and Follow-Me data indicative of the relative position of the user terminal 11 relative to the motor vehicle 1 and the operating state of the surveillance device 16 to be sent to the electronic control unit 5.

The electronic control unit 5 is programmed to:

receive and process the Follow-Me data received from the user terminal 11 to determine the relative position of the user terminal 11 relative to the motor vehicle 1 and the operating state of the surveillance device 16, and control the automotive on-vehicle systems 2 to implement an automated driving system of the motor vehicle 1 based on the received Follow-Me data so as to cause the motor vehicle 1 to perform a Follow-Me low-speed manoeuvre to follow the movements of the user in possession of the user terminal 11, as long as the operating state of the surveillance device 16 is such as to indicate the presence and the surveillance of the user who transports the user terminal 11 on the execution of the Follow-Me low-speed manoeuvre, and to immediately stop the Follow-Me low-speed manoeuvre, and thus cause the immediate stop of the motor vehicle 1, when the operating state of the surveillance device 16 is such as to indicate the absence of a supervision by the user on the execution of the Follow-me low-speed manoeuvre.

In an embodiment, to control the automated driving system 3 of the motor vehicle 1 to cause the motor vehicle 1 to follow the movements of the user in possession of the user terminal 11, the electronic control unit 5 is programmed to:

receive and process sensory data from the sensory system of the motor vehicle 1, for example from ultrasound sensors, surround view cameras, laser scanners, etc., to identify and fellow, based on the relative position of the user terminal 11 relative to the motor vehicle 1, the user in possession of the user terminal 11 and who is to be followed the motor vehicle 1 through the Follow-me low-speed manoeuvre, and control the automated driving system 3 of the motor vehicle 1 to cause the motor vehicle 1 to follow the movements of the identified user.

In a preferred embodiment, to identify the user to be followed, the sensory system of the motor vehicle 1 conveniently comprises a front or forward-looking or forward-facing camera 17, which, as is known, is a digital image sensor used in safety driving assistance systems and integrates a dedicated digital image processor capable of performing different processing simultaneously to perform different applications, such as lane recognition, detection of moving and approaching motor vehicles, control of head-light illumination distribution, vehicle detection, pedestrian detection, traffic sign recognition.

Figure 2:
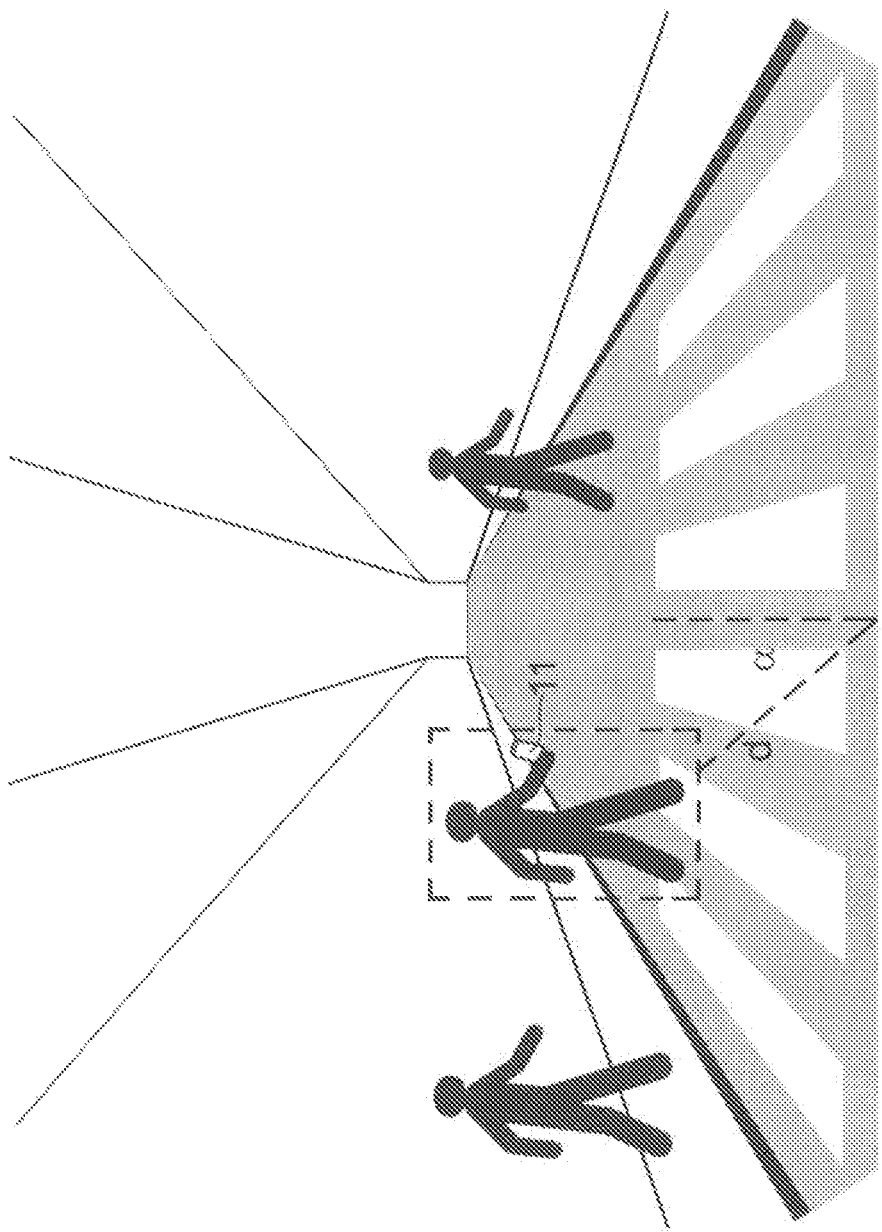
FIGS. 2, 3, and 4 show features relating to the execution of a Follow-Me manoeuvre by means of a user terminal.

In this embodiment, schematically shown in FIG. 2, the electronic control unit 5 is programmed to:

receive and process digital images from the front camera 17 of the motor vehicle 1 to identify in the received digital images, based on the relative position of the user terminal 11 relative to the motor vehicle 1, and then in the received digital images, the user in possession of the user terminal 11 and who is to be followed by the motor vehicle 1 through the Follow-me low-speed manoeuvre, and control the automated driving system 3 of the motor vehicle 1 to cause the motor vehicle 1 to follow the movements of the user identified in the received digital images.

Identification of the user to be followed in the digital images may be strengthened by using further sensory data from the sensory system of the motor vehicle 1, for example by ultrasound sensors, surround view cameras, laser scanners.

In an alternative embodiment, the electronic control unit 5 may instead be programmed to follow the movements of the user in possession of the user terminal 11 by controlling the automated driving system 3 of the motor vehicle 1 to cause the motor vehicle 1 to perform a trajectory such as to keep the relative position of the user terminal 11 substantially constant relative to the motor vehicle 1.

In an embodiment, the surveillance device 16 may be manufactured in the most appropriate forms, for example in the form of a soft button displayed on the display 15 of the user terminal 11 and to be kept pressed continuously during the execution of the Follow-me low-speed manoeuvre so as to allow the Follow-me low-speed manoeuvre to be executed only upon detection of a continuous action by the user on the user terminal 11.

Alternatively or in addition to the soft button to be kept pressed, the surveillance device 16 may be implemented as the need to maintain the motor vehicle 1 in the field of view of the digital image capture device 14 of the user terminal 11, in such a way that the Follow-me low speed manoeuvre may be interrupted, and the motor vehicle 1 consequently stopped, by means of a sudden movement of the user terminal 11 such as to cause the motor vehicle 1 to be outside the field of view of the digital image capture device 14 of the user terminal 11.

In this embodiment, the APP is designed to cause, when executed, the user terminal 11 to:

process the digital images of the motor vehicle 1 captured by the digital image capture device 14 of the user terminal 11 to recognize the presence of the motor vehicle 1 in the captured digital images cause the Follow-me low-speed manoeuvre to be performed, or restarted, if previously interrupted, when the motor vehicle 1 is (again) recognized in the captured digital images, and cause the Follow-me low-speed manoeuvre to be interrupted when the motor vehicle 1 is not recognized in the captured digital images.

Figure 3:
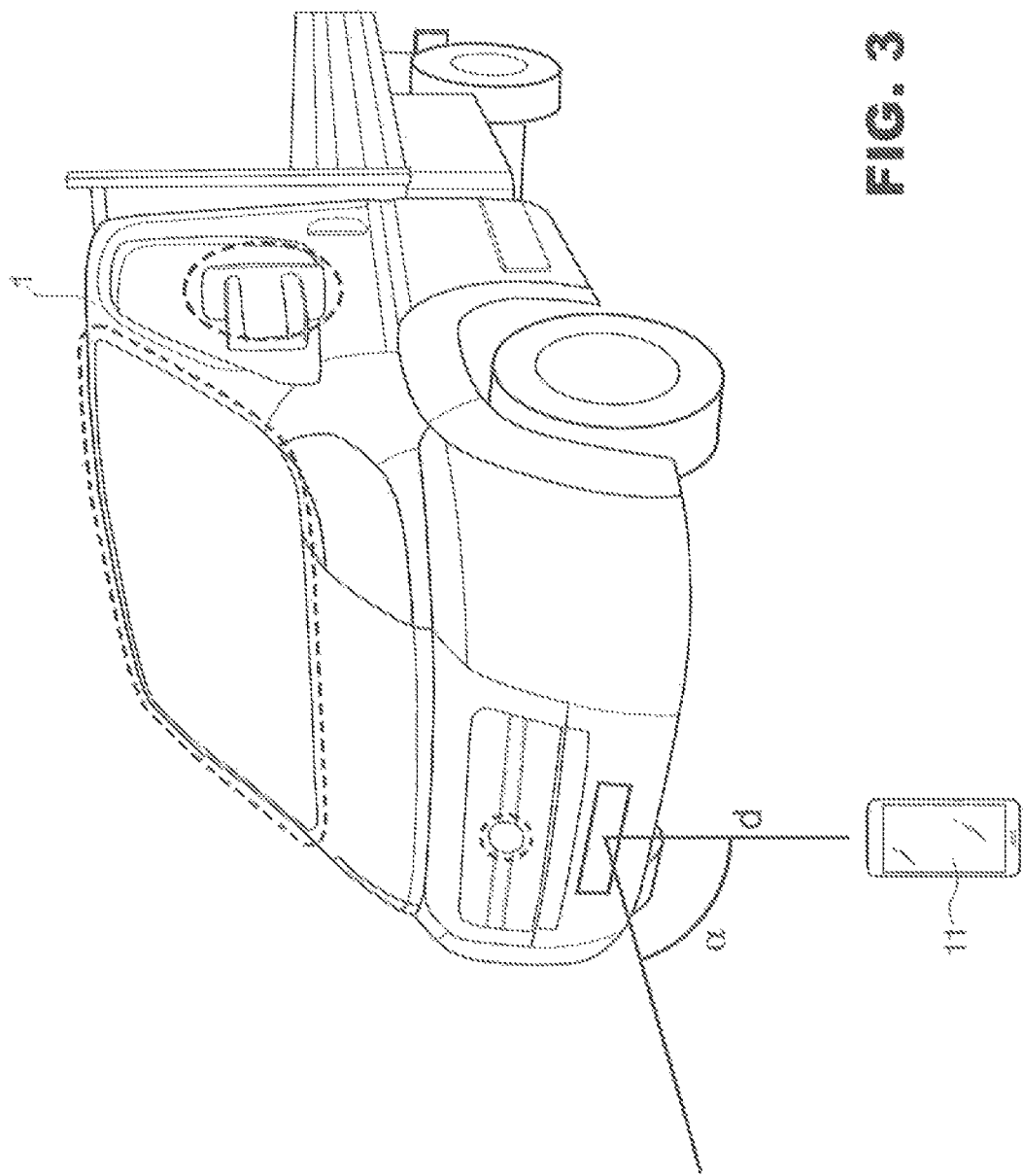
Figure 4:
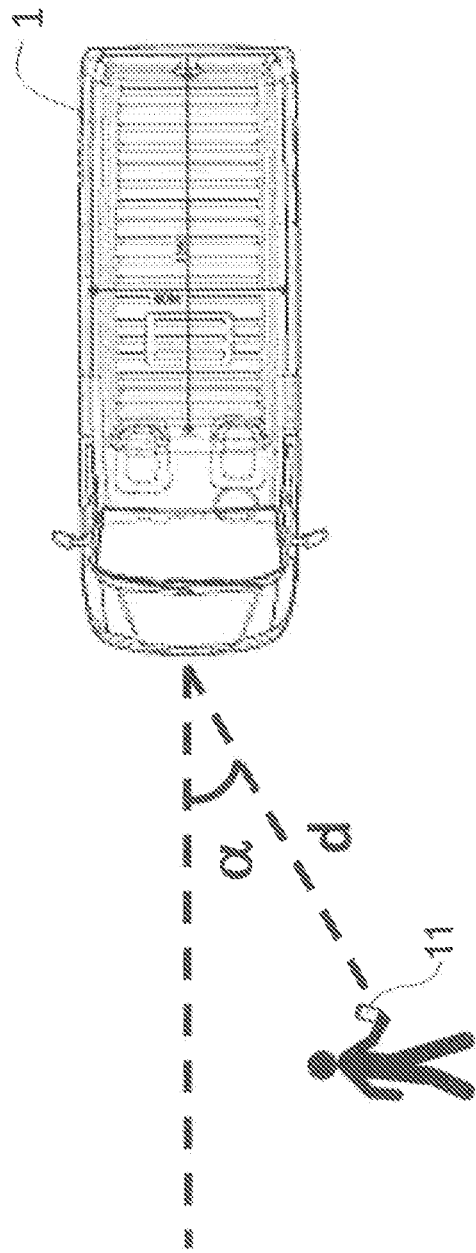

In an embodiment shown in FIGS. 3 and 4, the APP is designed to cause, when executed, the user terminal 11 to compute its relative position relative to the motor vehicle 1 in the form of distance and angle between the user terminal 11 and the motor vehicle 1.

In this embodiment, the APP is designed to cause, when executed, the user terminal 11 to process the digital images of the motor vehicle 1 captured by the digital image capture device 14 of the user terminal 11 to:
- compute a position of a longitudinal axis of the motor vehicle 1 in a reference system,
- compute an angle formed by an optical axis of the digital image capture device 14 of the user terminal 11 with the longitudinal axis of the motor vehicle 1 in the aforementioned reference system, and
- compute a distance between the user terminal 11 and the motor vehicle 1 along the optical axis of the digital image capture device 14 of the user terminal 11.

In this embodiment, the APP is designed to cause, when executed, the implementation of the Follow-Me functionality to require framing through the digital image capture device 14 of the user terminal 11 of a front part of the motor vehicle 1 conveniently comprising the license plate of the motor vehicle 1.

For this purpose, the APP is designed to cause, when executed, the user terminal 11 to process the digital images of the motor vehicle 1 captured by the digital image capture device 14 of the user terminal 11 to:
- recognize and compute the position of the license plate of the motor vehicle 1 in the aforementioned reference system, and
- compute the position of the longitudinal axis of the motor vehicle 1 as an axis substantially perpendicular to and passing through the centre of the license plate of the motor vehicle 1.

In order to strengthen computation of the distance and of the angle between the user terminal 11 and the motor vehicle 1, the APP may be further designed to cause, when executed, the user terminal 11 to process the digital images of the motor vehicle 1 captured by the digital image capture device 14 of the user terminal 11 to:
- recognize and compute also the position of other front parts of the motor vehicle 1, such as, for example, a windscreen, external rear-view mirrors, wheels, front logo usually placed in the centre of a front radiator grill, etc., and
- compute the distance and the angle between the user terminal 11 and the motor vehicle 1 also based on the positions of these additional front parts of the motor vehicle 1.

In order to increase security of the Follow-Me functionality against any improper use, the APP may be further designed to cause that, during initial settings of the APP and through the graphical user interface displayed on the display 15 of the terminal 11, input be requested of the alphanumeric characters of the license plate of the motor vehicle 1 to be remotely controlled, so as to allow the license plate of the motor vehicle 1 framed by the digital image capture device 14 of the user terminal 11 to be verified against the one inputted during initial settings of the APP.

In this embodiment, the APP is to be designed to cause, when executed, the user terminal 11 to process the digital images of the motor vehicle 1 captured by the digital image capture device 14 of the user terminal 11 to:
- recognize the alphanumeric characters of the license plate of the motor vehicle 1 through Optical Character Recognition—OCR,
- compare the recognized alphanumeric characters with the inputted alphanumeric characters of the license plate of the motor vehicle 1, and
- enable the Follow-Me functionality only if the recognized alphanumeric characters coincide with the inputted alphanumeric characters of the license plate of the motor vehicle 1.

The above description allows the advantages of the present invention to be appreciated.

In particular, the present invention allows the technology present on all the user terminals and on a part of the motor vehicles present on the market to be exploited, which technology is destined to grow rapidly in the coming years to allow a Follow-Me functionality to be simply and safely implemented and by means of which it is possible to cause a motor vehicle to perform a Follow-Me manoeuvre using a user terminal.

The invention claimed is:
1. A system comprising:
a motor vehicle and a user terminal, the motor vehicle comprising an automated driving system to perform a Follow-Me low-speed manoeuvre under the control of the user terminal from the outside of the motor vehicle;
the motor vehicle comprises:
automotive on-vehicle systems comprising a propulsion system, a braking system, a steering system, and a sensory system,
an automotive communications system to communicate with communications systems of user terminals, and
an automotive electronic control unit configured to be connectable to the automotive on-vehicle systems and to the communications system, and to co-operate with the automotive on-vehicle systems to implement the automotive automated driving system;
the user terminal comprises:
a digital image capture device, and
a communications system to communicate with automotive communications systems;
the user terminal is further programmed to communicate and co-operate with the electronic control unit of the motor vehicle to implement a Follow-Me functionality that allows a user from outside of the motor vehicle and in possession of the user terminal to cause the motor vehicle to perform a Follow-Me low-speed manoeuvre under the control of the user terminal;
the user terminal is further programmed to:
set up a communication between the communications systems of the motor vehicle and of the user terminal,
send to the automotive electronic control unit of the motor vehicle Follow-Me data to perform a Follow-Me low-speed manoeuvre under the control of the user terminal;
the automotive electronic control unit is programmed to:
receive the Follow-Me data from the user terminal, and
control the automotive automated driving system of the motor vehicle based on the received Follow-Me data to cause the motor vehicle to perform a Follow-Me low-speed manoeuvre under the control of the user terminal;
the user terminal further configured to:
turn on the digital image capture device to allow the user to frame the motor vehicle:
capture one or more digital images of the motor vehicle framed by the digital image capture device of the user terminal and process the captured digital image(s) to identify the motor vehicle in the captured digital images and compute a relative position of the user terminal with respect to the identified motor vehicle based on the captured digital images;
implement a surveillance device, whose operating state is indicative of a continuous surveillance of the user in possession of the user terminal on the execution of the Follow-me manoeuvre; and
send to the automotive electronic control unit of the motor vehicle Follow-Me Data indicative of the relative posi- tion of the user terminal with respect to the identified motor vehicle and of the operating state of the surveillance device;

the automotive electronic control unit further configured to:

receive the Follow-Me data from the user terminal and process the received Follow-Me data to determine the relative position of the user terminal with respect to the motor vehicle and the operating state of the surveillance device; and control the automotive automated driving system of the motor vehicle based on the determined relative position of the user terminal with respect to the motor vehicle and operating state of the surveillance device to cause the motor vehicle to perform a Follow-Me low-speed manoeuvre under the control of the user terminal so as to follow displacements of the user in possession of the user terminal as long as the operating state of the surveillance device is such as to indicate a continuous surveillance of the user in possession of the user terminal on the execution of the Follow-Me low-speed manoeuvre, and to interrupt the Follow-Me low-speed manoeuvre when the operating state of the surveillance device is such as to indicate an interruption of the surveillance of the user in possession of the user terminal on the execution of the Follow-Me manoeuvre.

2. The system according to claim 1, wherein the automotive electronic control unit is further programmed to:

receive and process sensory data supplied by the sensory system of the motor vehicle to identify and follow, based on the relative position of the user terminal with respect to the motor vehicle, the user who is in possession of the user terminal and has to be followed by the motor vehicle via the Follow-Me low-speed manoeuvre, and control the automated driving system of the motor vehicle to follow the displacements of the identified user.

3. The system according to claim 2, wherein the sensory system of the motor vehicle comprises a digital image sensor and wherein the automotive electronic control unit is further programmed to:

receive and process digital images from the digital image sensor of the motor vehicle to identify in the received digital images, based on the relative position of the user terminal with respect to the motor vehicle, and then follow in the received digital images, the user who is in possession of the user terminal and has to be followed by the motor vehicle via the Follow-Me low-speed manoeuvre, and control the automated driving system of the motor vehicle to follow the displacements of the identified user in the received digital images.

4. The system according to claim 1, wherein the user terminal is further programmed to cause the surveillance device is to be provided in one or more of the following forms:

a soft key displayed on a display of the user terminal and to be kept continuously pressed during execution of the Follow-Me low-speed manoeuvre to cause the Follow-Me low-speed manoeuvre to be executed only in response to the detection of a continuous action by the user on the user terminal, and need to keep the motor vehicle within the field of view of the digital image capture device of the user terminal, so that the Follow-Me low-speed manoeuvre may be interrupted and the motor vehicle be consequently stopped in response to a sudden movement of the user terminal such as to cause the motor vehicle to exit from the field of view of the digital image capture device of the user terminal.

5. The system according to claim 4, wherein the user terminal is further programmed to:

process the digital images of the motor vehicle captured by the digital image capture device to recognize the presence of the motor vehicle, cause the Follow-Me low-speed manoeuvre to be executed, or to be resumed, if previously interrupted, when the motor vehicle is again recognized in the captured digital images, and cause the Follow-Me low-speed manoeuvre to be interrupted when the motor vehicle is not recognized in the captured digital images.

6. The system according to claim 1, wherein the user terminal is further programmed to compute its own position with respect to the motor vehicle in the form of a distance and an angle between the user terminal and the motor vehicle.

7. The system according to claim 6, wherein the user terminal is further programmed to process the digital images of the motor vehicle captured by the digital image capture device to:

compute a position of a longitudinal axis of the motor vehicle in a reference system;

compute an angle formed by an optical axis of the digital image capture device with the longitudinal axis of the motor vehicle in the aforesaid reference system; and compute a distance between the user terminal and the motor vehicle along the optical axis of the digital image capture device.

8. The system according to claim 7, wherein the user terminal is further programmed to process the digital images of the motor vehicle captured by the digital image capture device to:

recognize and compute a position of a front license plate of the motor vehicle in the aforesaid reference system, and compute the position of the longitudinal axis of the motor vehicle as an axis substantially orthogonal to, and passing through the centre of, the license plate of the motor vehicle.

9. The system according to claim 8, wherein the user terminal is further programmed to process the digital images of the motor vehicle captured by the digital image capture device to:

recognize and compute positions of further front parts of the motor vehicle comprising one or more of the following: windscreen, external rear-view mirrors, wheels, and front logo in the centre of a front radiator grill, and compute the distance and the angle between the user terminal and the motor vehicle also based on the positions of these further front parts of the motor vehicle.

10. The system according to claim 8, wherein the user terminal is further programmed to:

prompt a user to input alphanumeric characters of a license plate of the motor vehicle that should perform a Follow-Me low-speed manoeuvre, and process the digital images of the motor vehicle captured by the digital image capture device to:

recognize alphanumeric characters of the license plate of the motor vehicle by means of an optical character recognition technology, compare the recognized alphanumeric characters with the inputted alphanumeric characters of the license plate of the motor vehicle, and enable the Follow-Me functionality if the recognized alphanumeric characters match the inputted alphanumeric characters of the license plate of the motor vehicle.

11. A system to cause a motor vehicle equipped with an automotive automated driving system to perform a Follow-Me low-speed manoeuvre under the control of a user terminal from the outside of the motor vehicle;

the motor vehicle comprises:

automotive on-vehicle systems comprising a propulsion system, a braking system, a steering system, and a sensory system, an automotive communications system to communicate with communications systems of user terminals, and an automotive electronic control unit configured to be connectable to the automotive on-vehicle systems and to the communications system, and to co-operate with the automotive on-vehicle systems to implement the automotive automated driving system;

the user terminal comprises:

a digital image capture device, and a communications system to communicate with automotive communications systems;

the user terminal is further programmed to communicate and co-operate with the electronic control unit of the motor vehicle to implement a Follow-Me functionality that allows a user from outside of the motor vehicle and in possession of the user terminal to cause the motor vehicle to perform a Follow-Me low-speed manoeuvre under the control of the user terminal;

the user terminal is further programmed to:

set up a communication between the communications systems of the motor vehicle and of the user terminal, operate the digital image capture device so that the user can frame the motor vehicle, capture and process one or more digital images of the motor vehicle framed by the digital image capture device of the user terminal to identify the motor vehicle in the captured digital images and compute a relative position of the user terminal relative to the identified motor vehicle based on the captured digital images, implement a surveillance device, whose operating state is indicative of a continuous surveillance of the user in possession of the user terminal on the execution of the Follow-Me manoeuvre, and send to the automotive electronic control unit of the motor vehicle Follow-Me data indicative of the relative position of the user terminal relative to the identified motor vehicle and of the operating state of the surveillance device;

the automotive electronic control unit is programmed to:

receive and process the Follow-Me data transmitted by the user terminal to determine the relative position of the user terminal relative to the motor vehicle and the operating state of the surveillance device, and control the automotive automated driving system of the motor vehicle based on the Follow-Me data to cause the motor vehicle to perform a Follow-Me low-speed manoeuvre under the control of the user terminal, so as to follow displacements of the user in possession of the user terminal as long as the operating state of the surveillance device is such as to indicate a continuous surveillance of the user in possession of the user terminal on the execution of the Follow-Me low-speed manoeuvre, and to interrupt the Follow-Me low-speed manoeuvre when the operating state of the surveillance device is such as to indicate an interruption of the surveillance of the user in possession of the user terminal on the execution of the Follow-Me manoeuvre;

wherein the user terminal is further configured to cause the surveillance device to be provided in one or more of the following forms:

soft key displayed on a display of the user terminal and to be kept continuously pressed during execution of the Follow-Me low-speed manoeuvre to cause the Follow-Me low-speed manoeuvre to be executed only in response to the detection of a continuous action by the user on the user terminal, and need to keep the motor vehicle within the field of view of the digital image capture device of the user terminal, so that the Follow-Me low-speed manoeuvre may be interrupted and the motor vehicle be consequently stopped in response to a sudden movement of the user terminal such as to cause the motor vehicle to exit from the field of view of the digital image capture device of the user terminal;

wherein the user terminal is further configured to:

process the digital images of the motor vehicle captured by the digital image capture device to recognize the presence of the motor vehicle, cause the Follow-Me low-speed manoeuvre to be executed, or to be resumed, if previously interrupted, when the motor vehicle is again recognized in the captured digital images, and cause the Follow-Me low-speed manoeuvre to be interrupted when the motor vehicle is not recognized in the captured digital images.

12. A system to cause a motor vehicle equipped with an automotive automated driving system to perform a Follow-Me low-speed manoeuvre under the control of a user terminal from the outside of the motor vehicle;

the motor vehicle comprises:

automotive on-vehicle systems comprising a propulsion system, a braking system, a steering system, and a sensory system, an automotive communications system to communicate with communications systems of user terminals, and an automotive electronic control unit configured to be connectable to the automotive on-vehicle systems and to the communications system, and to co-operate with the automotive on-vehicle systems to implement the automotive automated driving system;

the user terminal comprises:

a digital image capture device, and a communications system to communicate with automotive communications systems;

the user terminal is further programmed to communicate and co-operate with the electronic control unit of the motor vehicle to implement a Follow-Me functionality that allows a user from outside of the motor vehicle and in possession of the user terminal to cause the motor vehicle to perform a Follow-Me low-speed manoeuvre under the control of the user terminal;

the user terminal is further programmed to:

set up a communication between the communications systems of the motor vehicle and of the user terminal, operate the digital image capture device so that the user can frame the motor vehicle, capture and process one or more digital images of the motor vehicle framed by the digital image capture device of the user terminal to identify the motor vehicle in the captured digital images and compute a relative position of the user terminal relative to the identified motor vehicle based on the captured digital images,
implement a surveillance device, whose operating state is indicative of a continuous surveillance of the user in possession of the user terminal on the execution of the Follow-Me manoeuvre, and
send to the automotive electronic control unit of the motor vehicle Follow-Me data indicative of the relative position of the user terminal relative to the identified motor vehicle and of the operating state of the surveillance device;
the automotive electronic control unit is programmed to:
receive and process the Follow-Me data transmitted by the user terminal to determine the relative position of the user terminal relative to the motor vehicle and the operating state of the surveillance device, and
control the automotive automated driving system of the motor vehicle based on the Follow-Me data to cause the motor vehicle to perform a Follow-Me low-speed manoeuvre under the control of the user terminal, so as to follow displacements of the user in possession of the user terminal as long as the operating state of the surveillance device is such as to indicate a continuous surveillance of the user in possession of the user terminal on the execution of the Follow-Me low-speed manoeuvre, and to interrupt the Follow-Me low-speed manoeuvre when the operating state of the surveillance device is such as to indicate an interruption of the surveillance of the user in possession of the user terminal on the execution of the Follow-Me manoeuvre;
wherein the user terminal is further configured to compute its own position with respect to the motor vehicle in the form of a distance and an angle between the user terminal and the motor vehicle;
wherein the user terminal is further configured to process the digital images of the motor vehicle captured by the digital image capture device to:
compute a position of a longitudinal axis of the motor vehicle in a reference system,
compute an angle formed by an optical axis of the digital image capture device with the longitudinal axis of the motor vehicle in the aforesaid reference system, and
compute a distance between the user terminal and the motor vehicle along the optical axis of the digital image capture device.

* * * * *